(12) United States Patent
Jann et al.

(10) Patent No.: US 10,564,797 B2
(45) Date of Patent: *Feb. 18, 2020

(54) FLOATING TOOLBAR

(71) Applicant: SAP SE, Walldorf (DE)

(72) Inventors: Florian Jann, Heidelberg (DE);
Michael Krenkler, Wiesloch (DE);
Tina Rauschenbach, Mannheim (DE);
Emil Voutta, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,289

(22) Filed: Oct. 8, 2018

(65) Prior Publication Data
US 2019/0042060 A1 Feb. 7, 2019

Related U.S. Application Data

(63) Continuation of application No. 14/966,425, filed on Dec. 11, 2015, now Pat. No. 10,095,371.

(51) Int. Cl.
*G06F 3/0481* (2013.01)
*G06F 3/0482* (2013.01)
*G06T 13/80* (2011.01)
*G06F 3/0484* (2013.01)

(52) U.S. Cl.
CPC .......... *G06F 3/0481* (2013.01); *G06F 3/0482* (2013.01); *G06F 3/04845* (2013.01); *G06T 13/80* (2013.01); *G06F 2203/04804* (2013.01)

(58) Field of Classification Search
CPC .............................. G06F 3/011; G06F 3/0482
See application file for complete search history.

(56) References Cited

U.S. PATENT DOCUMENTS

| | | | |
|---|---|---|---|
| 10,095,371 B2 | 10/2018 | Jann et al. | |
| 2004/0150673 A1 | 8/2004 | Dobronsky | |
| 2005/0057497 A1 | 3/2005 | Kawahara | |
| 2005/0204306 A1 | 9/2005 | Kawahara et al. | |
| 2006/0253791 A1 | 11/2006 | Kuiken et al. | |
| 2009/0029674 A1 | 1/2009 | Brezina et al. | |
| 2009/0094554 A1 | 4/2009 | Karstens | |
| 2010/0088628 A1* | 4/2010 | Flygh | G06F 3/0481 715/779 |
| 2010/0302278 A1 | 12/2010 | Shaffer et al. | |
| 2012/0092253 A1 | 4/2012 | Irani et al. | |
| 2012/0162093 A1* | 6/2012 | Buxton | G06F 3/0482 345/173 |

* cited by examiner

*Primary Examiner* — Rayeez R Chowdhury
(74) *Attorney, Agent, or Firm* — Sterne, Kessler, Goldstein & Fox P.L.L.C.

(57) ABSTRACT

A device and a method for displaying content on a display device involve generating a graphical user interface including a toolbar in response to a request to display content. The toolbar is displayed simultaneously with the content on a display screen of the display device, with at least two sides of the toolbar are separated from edges of the display screen. The toolbar is partially transparent and brought onto display using an animation, separately from display of the content.

15 Claims, 10 Drawing Sheets

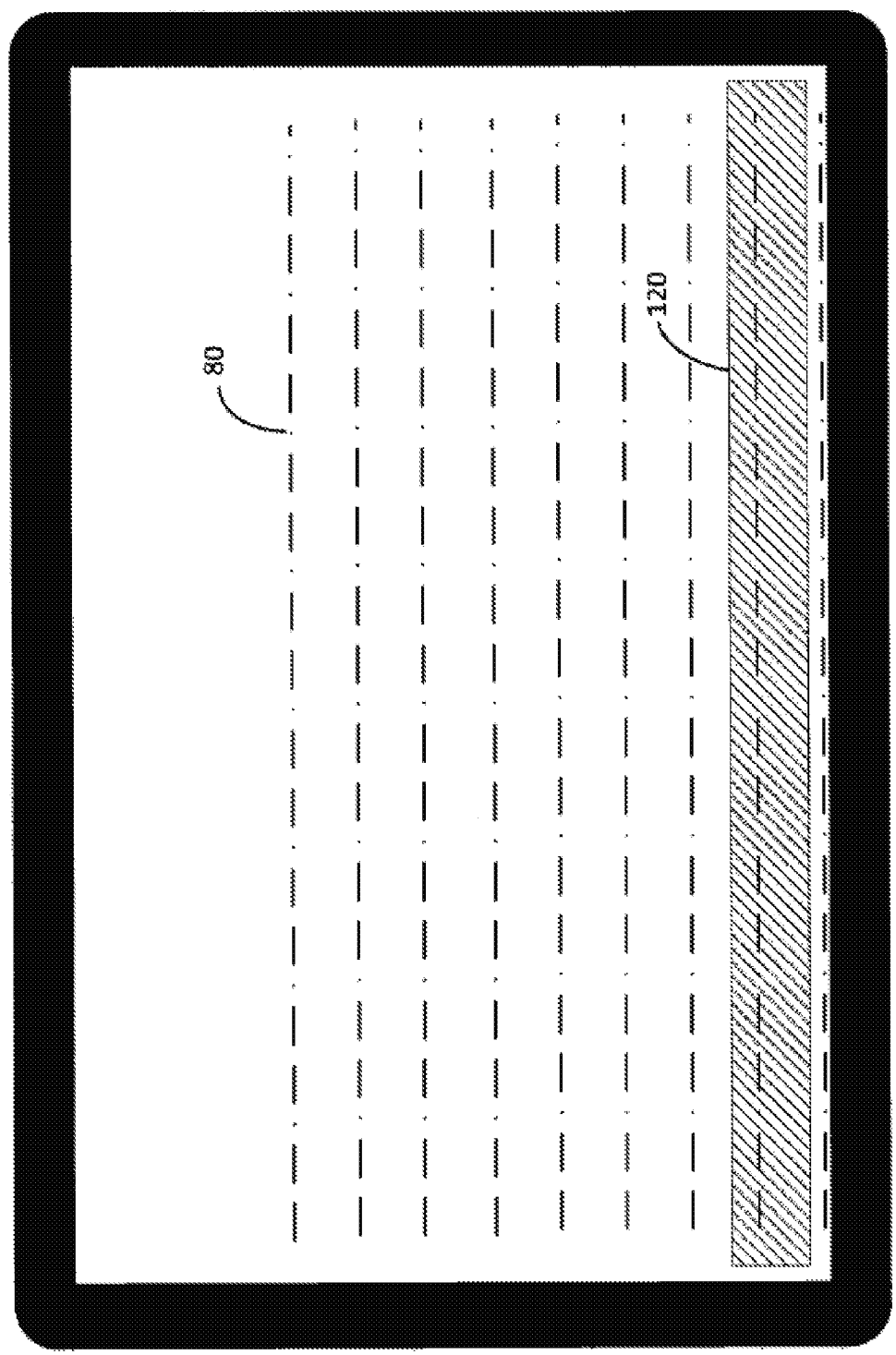

FLOATING TOOLBAR

CROSS REFERENCE TO RELATED APPLICATIONS

This application is a continuation of U.S. patent application Ser. No. 14/966,424 filed on Dec. 11, 2015, which is incorporated herein by reference in its entirety.

BACKGROUND

Software applications designed to support business processes often include, as part of a graphical user interface, a toolbar that provides user access to various functions. These toolbars are often placed at the bottom of a window in which content is displayed, so that the toolbars don't obscure the content. Additionally, business applications tend to display the content on a white background while displaying the toolbars using a dark color to provide visual contrast against the content.

An increasing proportion of modern monitors, mobile device displays, and other computer displays are framed by black or dark material. The combination of the dark frame of the display and the dark toolbar placed directly next to each other tends to be perceived as a unit by the user, making the toolbar hard to distinguish.

BRIEF DESCRIPTION OF THE DRAWINGS

FIGS. 5A to 5E show various animation states of a toolbar according to an example embodiment of the present disclosure.

DETAILED DESCRIPTION

The present disclosure relates to software applications that display content together with a toolbar. Such applications may comprise standalone software programs that include built-in toolbar functionality as described in the example embodiments herein. Alternatively, toolbar functionality may be provided separately from a program that generates the content, e.g., as an add-on package, a plug-in or a through a separate program that communicates with a content providing program via an application program interface (API). The content providing program and/or the toolbar program may be executed locally on a user device and/or remotely, as a Web application, for example.

Example embodiments relate to a floating toolbar that eliminates the above noted problems of conventional toolbars. The toolbar is no longer placed directly at the edge of the display, but rather with some space (a gap) between at least two sides of the tool bar and an opposing display edge, so that the toolbar appears to float within or hover over the display. One of these two sides may correspond to that side of a conventional toolbar which faces the content, e.g., the top side. Preferably, the toolbar is located at the bottom of the display as a footer, and the bottom, left, and right sides of the toolbar are spaced apart from the bottom, left, and right display edges, respectively. Thus, the at least two sides of the toolbar are noncontiguous with the display frame.

In an example embodiment, the toolbar is overlaid onto the displayed content so that part of the content is visible in a space between the toolbar and a display edge. This enhances contrast between the toolbar and the frame while maximizing the amount of displayed content. Additionally, the toolbar may be partially transparent so that content which would otherwise be hidden under the toolbar is visible, further improving the distinguishability between the toolbar and display frame and strengthening the floating effect.

In an example embodiment, the toolbar and the content are brought into view on the display at different times, by loading the toolbar separately. Preferably, the content is displayed first, then after a short delay, the toolbar is animated from an initial state into a resting state on the display. This further supports the user in recognizing the toolbar.

Figure 1:
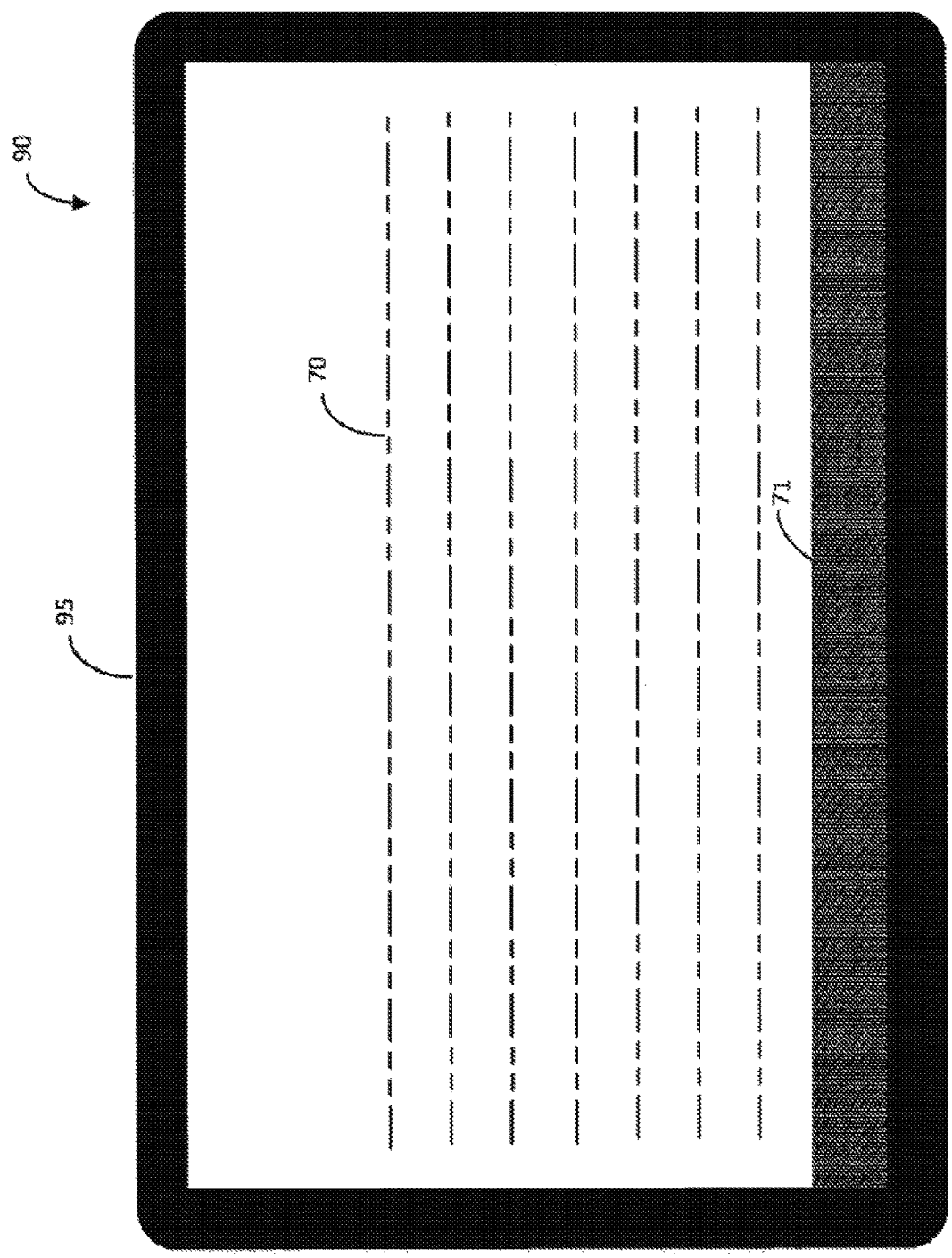
FIG. 1 shows a display device with a conventional toolbar.

FIG. 1 shows a display device 90 including a dark colored frame 95. Content 70 is displayed against a white background. A conventional toolbar 71 contacts the bottom, left and right display edges, resulting in reduced visibility and contrast of the toolbar 71.

Figure 2:
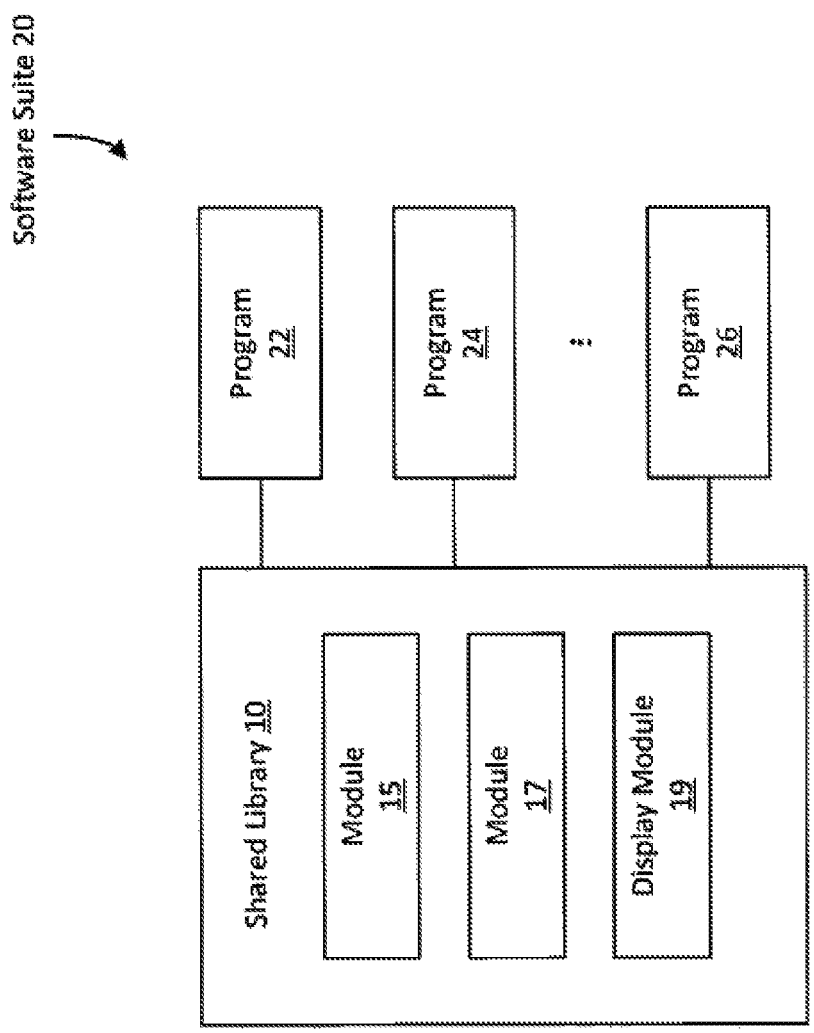
FIG. 2 is a block diagram a system including a software program according to an example embodiment of the present disclosure.

FIG. 2 is a block diagram of a system including a software program 20 according to an example embodiment of the present disclosure. The program 20 may comprise a suite of related software applications 22, 24 and 26 that provide functionality such as document creation, e-mail, instant messaging, inventory management, business account management, marketing, analytics, etc. The program 20 may further include a library 20 that contains instructions and/or data shared among the applications 22, 24, 26. Contents of the shared library 20 may include, for example, various software modules 15, 17 and 19 that provide generic or shared functions across multiple ones of the applications 22, 24, 26.

The module 19 is a display module that provides toolbar functionality in accordance with the example embodiments described herein. The program 20 is executed by at least one user computer (not shown) in the system. For example, the program 20 may be executed at least partially as a client application on a local computer of a user, including as a Web application on a mobile phone or a desktop computer. The program 20 may also include server components that support the functionality of the client application. Any number of mechanisms (for example, APIs, communication protocols, etc.) may be employed to interconnect and coordinate the various components of the program 20, which components may be deployed at multiple user devices, backend servers, cloud computers, etc.

Figure 3:
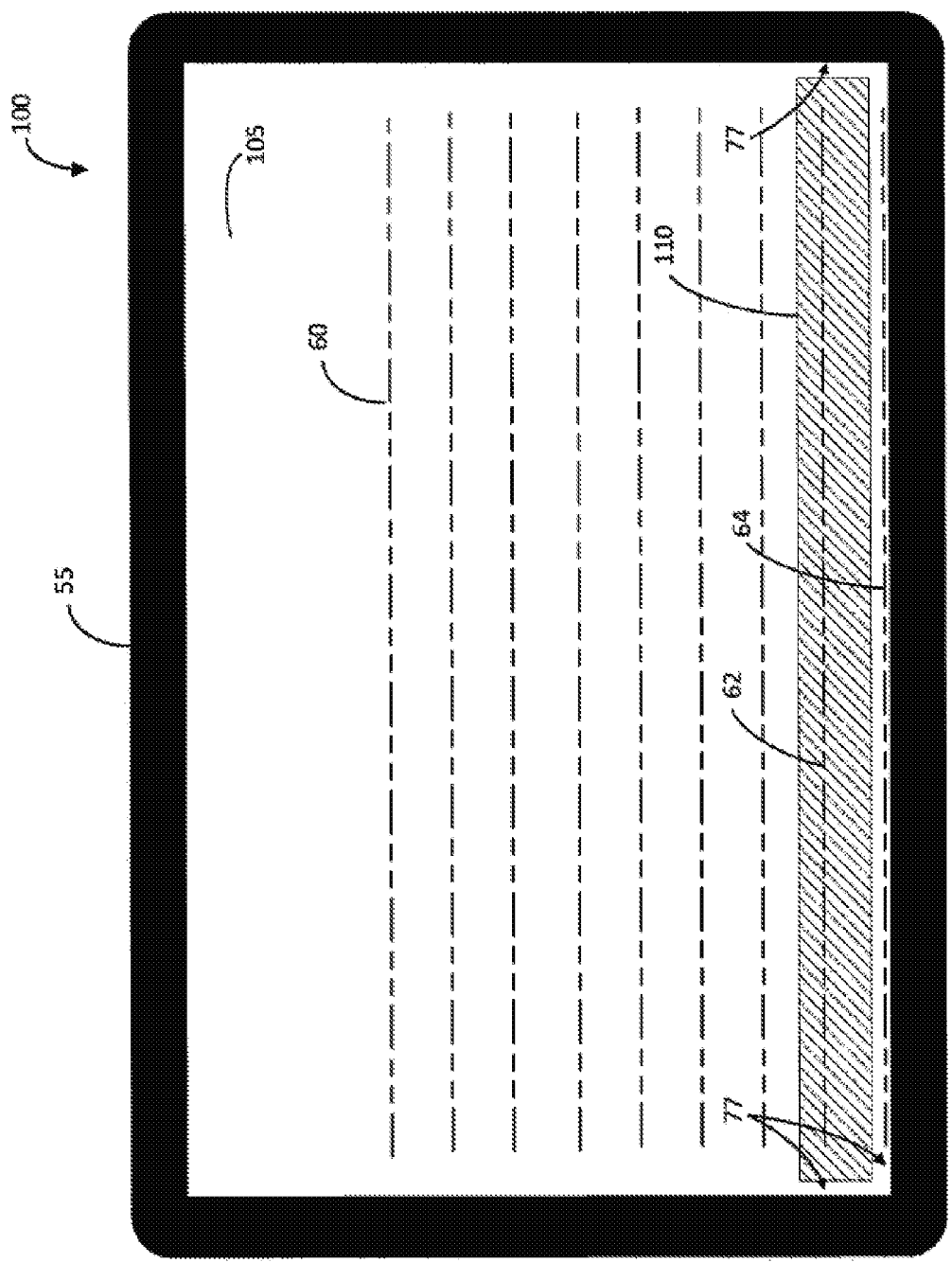
FIG. 3 shows a display device with a toolbar according to an example embodiment of the present disclosure.

FIG. 3 shows a display device 100 with a toolbar 110 according to an example embodiment of the present disclosure. The device 100 includes a dark colored frame 55 and a display screen 105 on which content 60 is displayed simultaneously with the toolbar 110. The content 60 may include text, images, a combination of text and images, etc. The content 60 may change during execution of the program 20, in response to user input and/or automated program instructions. For example, the content 60 may include a list of search results or a summary of business accounts, with the content being refreshed periodically when the program queries a database for updates.

The toolbar 110 may contain any number of display and/or action elements including, but not limited to, buttons, icons, navigation menus, checklists, and text input fields. A toolbar element may perform a generic action such as, for example, open, close, confirm, cancel, etc. The toolbar 110 may include an element that is specific to a particular context (for example, a particular application)—such as, for example, approve, reject, add to contacts, generate invoice, etc. As with the content 60, the toolbar elements may change during program execution. Toolbar elements may be swapped in and out, repositioned, resized, etc.

The toolbar 110 is overlaid onto the content 60. A background color of the toolbar 110 is dark, possibly the same color as the frame 55. However, the toolbar 110 is partially transparent so that underlying content 62 is visible through the toolbar 110. The degree of transparency may be such that the underlying content 62 is fully legible. Alternatively, the toolbar 110 may only be transparent enough to enable the user to know that some content exists beneath the toolbar, without seeing content details. In fact, even if the toolbar 110 is transparent enough to permit reading, the underlying content 62 may optionally be obscured through a visual effect such as blurring, thereby directing the user's attention towards the toolbar elements and away from the underlying content.

As shown in FIG. 3, the tool bar 110 is spaced apart from the bottom, left and right display edges by gaps 77. The size of the gaps 77 may be fixed. Alternatively, gap size may be user adjustable. A default gap size may be such that the content 60 is partially visible at one or more gaps. For example, if the content includes lines of text, a bottommost line 64 may be visible through the gap 77 at the bottom of the toolbar 110. Meanwhile, a majority of the content 60 (e.g., more than fifty percent) resides above the toolbar 110. The line 64 need not be entirely visible. For example, parts of the text may be cut off by the toolbar and/or the display edge, requiring scrolling to move the line 64 above the toolbar 110 for full viewing.

Various properties of the toolbar 110 may be dynamically adjusted based on any number of factors. Dynamic adjustments may comprise, for example, changes in background color, color palette transitions, animation speed changes, opacity/transparency shifts, randomization of various effects, toolbar size and orientation, etc. Factors that may be considered for dynamic adjustments may include, for example, time (elapsed session time, elapsed time at a particular step performed by the user, etc.); certain user actions (open, close, save, delete, etc.); device orientation; etc.

Additional elements that may be considered during dynamic adjustments include various environmental factors such as ambient light (as sensed by, for example, a light detecting component on or in communication with the device 100—a charge-coupled device (CCD) camera, a photodiode, a complementary metal-oxide semiconductor (CMOS) sensor, etc.).

Figure 4:
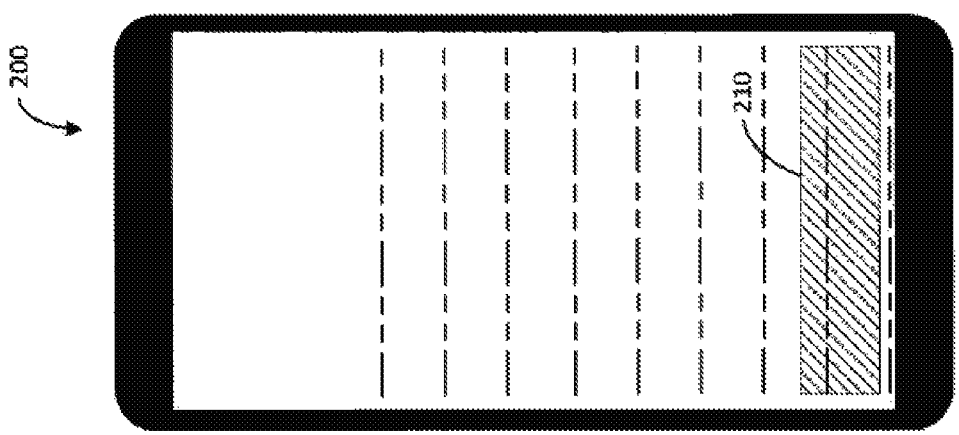
FIG. 4 shows another display device with a toolbar according to an example embodiment of the present disclosure.

FIG. 4 shows a display device 200 with a toolbar 210 according to an example embodiment of the present disclosure. The device 200 has a smaller, narrower display than the device 100 in FIG. 3. Therefore, the content and toolbar may be adapted to the display by, for example, reducing the amount of content displayed, reducing font size, adjusting dimensions of the toolbar, etc. The toolbar 210 is similar to the toolbar 110 in that the toolbar 210 is partially transparent and spaced apart from the bottom, left and right display edges. Thus, toolbars in accordance with the described embodiments may be implemented with displays of various shapes (e.g., non-rectangular) and sizes, including displays of desktop computers, laptop computers, smartphones, tablets, smartwatches, etc. Further, toolbar functionality may be applied in the same software program across different platforms so that a user has a similar visual experience when executing the program in different ones of the above mentioned devices. For example, a user viewing a document on a desktop computer may see a toolbar similar to what the user sees when viewing the document on a smartphone. The toolbar on the smartphone may be smaller, but still provide access to at least some of the same functions provided by the desktop toolbar.

FIGS. 5A to 5E show various animation states of the toolbar 110 according to an example embodiment of the present disclosure. The toolbar 110 may be displayed using an animation by which the toolbar 110 is brought to a resting state after a short delay with respect to a display of the content 60. Therefore, the toolbar 110 may be loaded for display separately from the content 60. For example, the toolbar 110 may be displayed a second or two after the content and the animation may take several more seconds to bring the toolbar 110 to its resting state. The animation may involving moving the toolbar 110 from an initial position shown in FIG. 5A towards a resting position near a display edge (the position in FIG. 3, for example). The animation may additionally or alternatively include any number of visual embellishments such as background color changes, fading in or out of toolbar elements, etc.

Figure 5A:
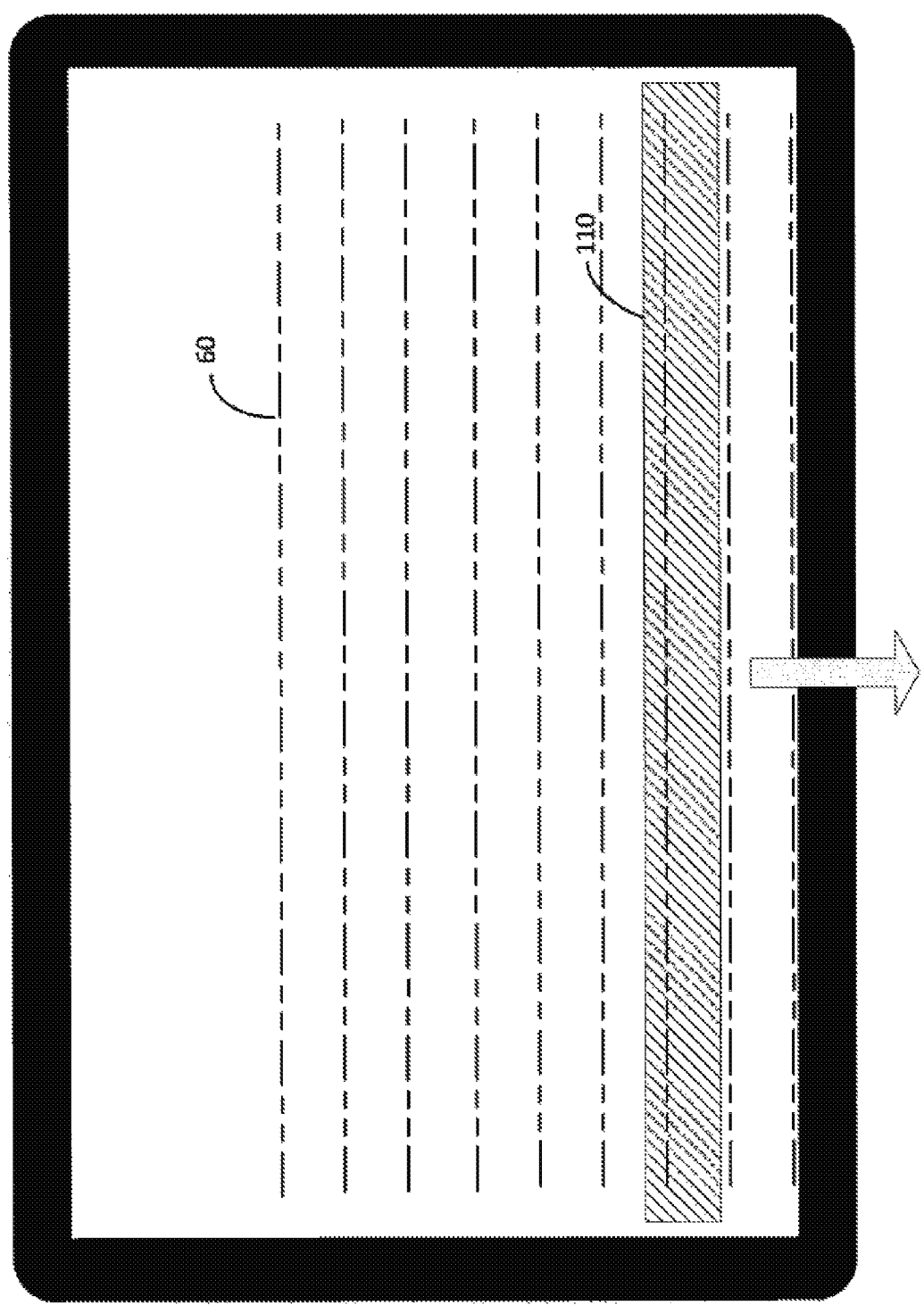
Figure 5B:
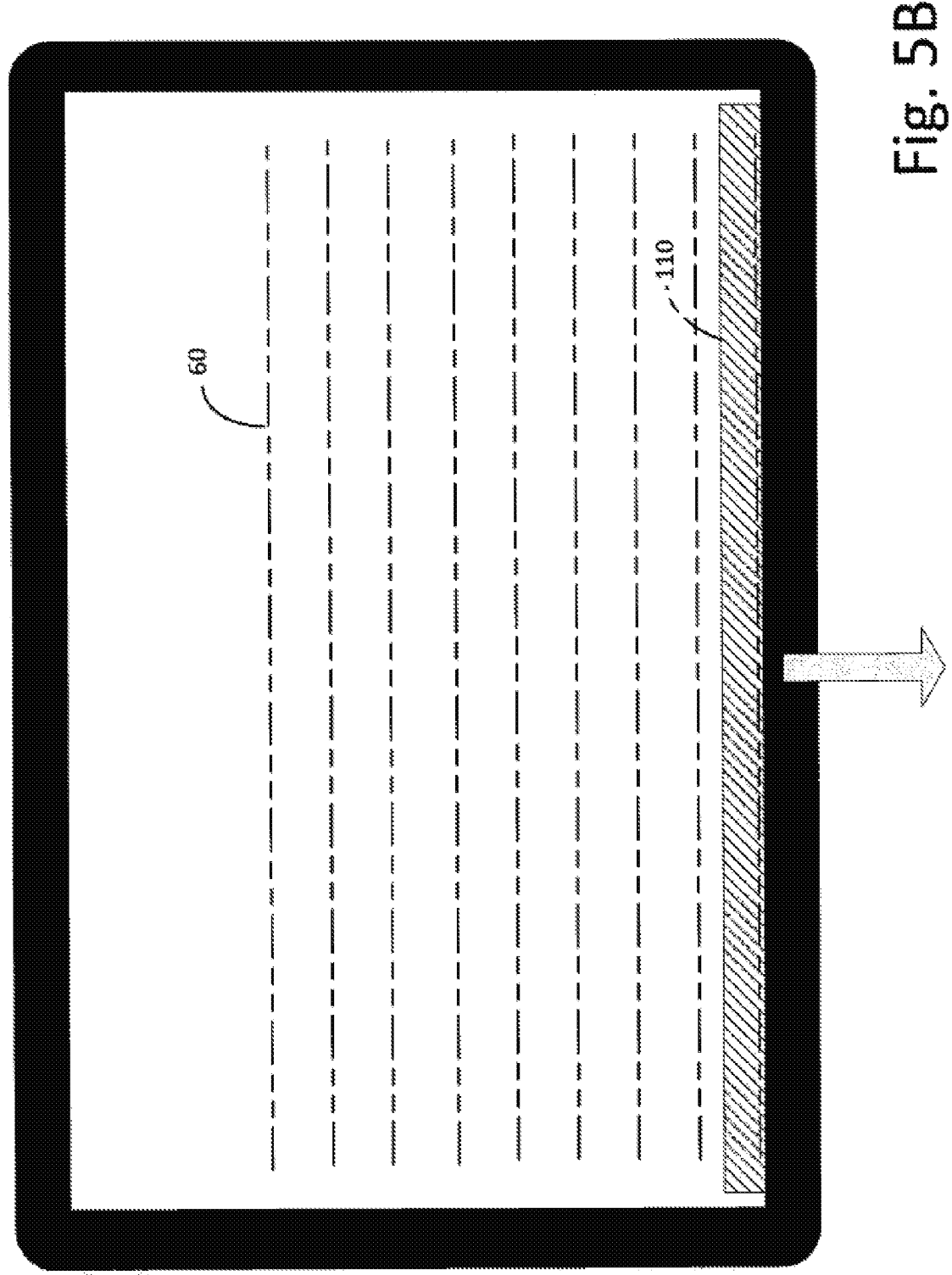
Figure 5C:
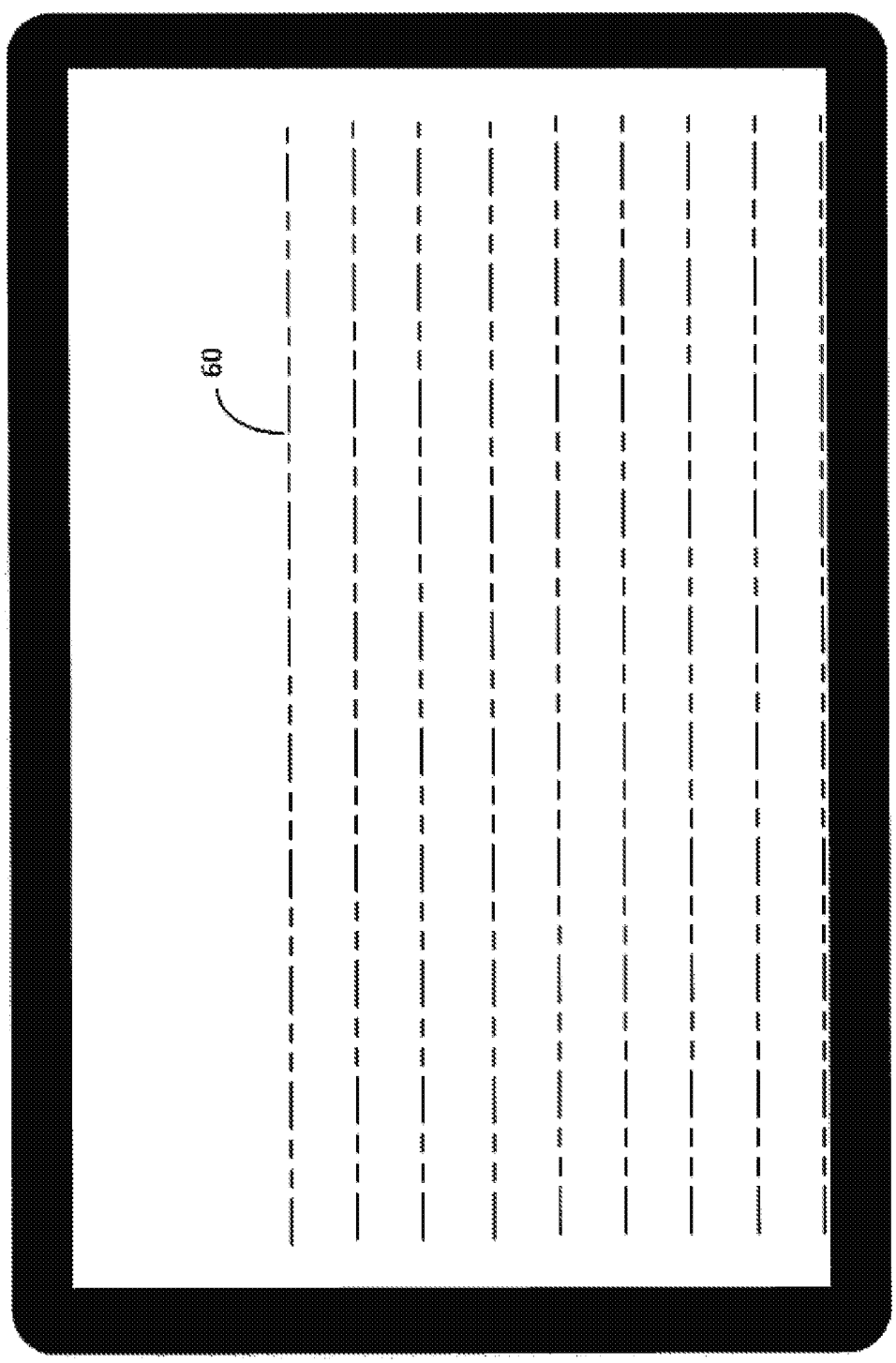

FIG. 5B shows an animation state of the toolbar 110 that takes place in response to a request to switch to the display of new content, e.g., as part of a context switch within the program 20. The new content may be displayed as a new page, by refreshing the entire display. Prior to displaying the new content, the toolbar 110 may be animated out of view by, for example, moving the toolbar 110 beyond the bottom display edge so that, eventually, only the content 60 remains, as shown in FIG. 5C.

Figure 5D:
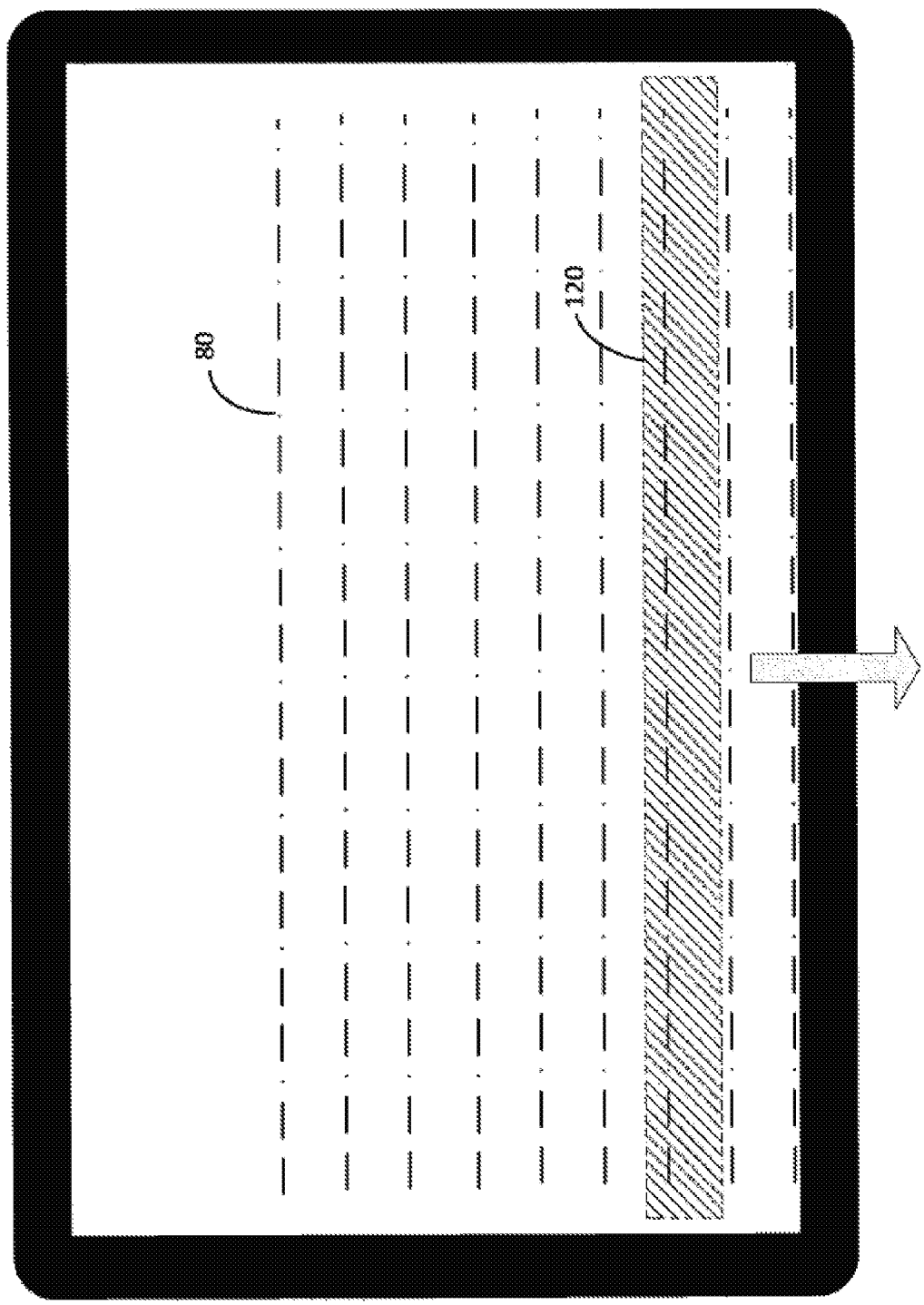

After the toolbar 110 is removed from display, the content 60 is also removed to bring new content onto the display. The new content may not require a toolbar. However, as shown in FIG. 5D, when new content 80 requires a toolbar 120, the toolbar may be animated onto the display in a similar fashion as the earlier described animation of the toolbar 110. As shown in FIG. 5E, a resting state of the toolbar 120 may be the same as the toolbar 110 in FIG. 3. For example, the toolbar 120 may be brought to the same resting position as the toolbar 110.

Figure 6:
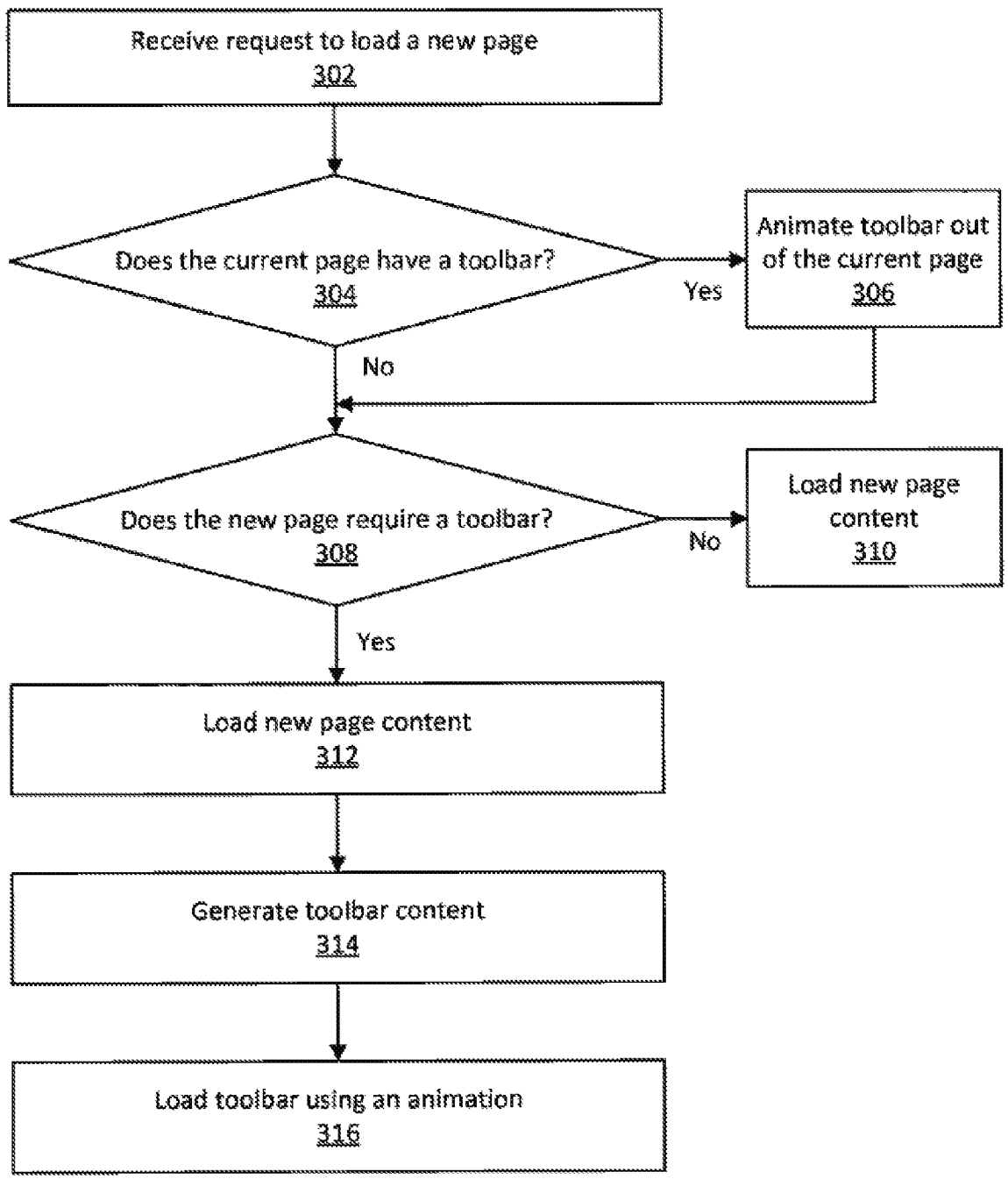
FIG. 6 is a flowchart of a method for displaying a toolbar according to an example embodiment of the present disclosure.

FIG. 6 shows a flowchart of a method 300 for displaying a toolbar according to an example embodiment of the present disclosure. The method 300 may be performed on one or more of the devices 100, 200, possibly with support for content or toolbar functionality residing on another device such as a back-end server, a cloud computer, etc. The flowchart is an illustrative example of control logic for toolbar display. However other algorithms, logic, rules, etc. may be used to generate the toolbar and/or the content for display. Thus, steps illustrated in the flowchart may be omitted and/or certain step sequences may be altered, and, in certain instances multiple illustrated steps may be simultaneously performed.

At step 302, the program 20 may receive a request to load a new page of content. The request may be user initiated by, for example, activating a toolbar element. Requests may also be generated automatically during the course of program execution.

At step 304, the program 20 determines whether the current page has a toolbar. If so, the toolbar is animated out of the current page, off display (step 306). The animation may be that shown in FIGS. 5B and 5C, where the toolbar is moved from its resting position down past the bottom edge of the display so that only the content remains. Other animations are possible including, for example, fading out the toolbar without moving, applying a reverse animation (from the resting animation state to the initial animation state), moving the toolbar sideways off the display, etc.

If the current page does not have a toolbar, the method proceeds to step 308, where it is determined whether the new page requires a toolbar. If the new page does not require a toolbar, then the new page is loaded for display (step 310).

If the new page requires a toolbar, then the new page content is loaded for display (step 312). After the new page is displayed, content for the new toolbar is generated (step 314). The new toolbar's content may include pre-specified user interface elements such as buttons for triggering generic actions, in addition to dynamic elements generated, for example, in response to changes in the content or in content-related information.

At step 316, the toolbar content is loaded for display using an animation, the animation in FIG. 5A, for example. While the toolbar is being animated, the program 20 may disregard or prevent user input. After the toolbar has reached its resting state (e.g., a resting position near the bottom display edge), the program 20 may resume accepting user input.

Example embodiments were described in which the toolbar is placed at the bottom of the display as a footer. However, a floating toolbar may be positioned anywhere on a display, for example, near the top display edge. Additionally, a floating toolbar may be dynamically moved, repositioned, etc. based on, for example, changes in the displayed content, device orientation, user actions, etc. In particular, a floating toolbar may be manually moved or repositioned by a user (e.g., translated up/down/left/right, rotated, redimensioned, flipped, etc.). If the toolbar is manually moved or repositioned, the program may automatically restrict any movement such that the toolbar cannot come closer than a threshold distance, for example, a threshold number of pixels equal to the gap 77 of the resting animation state. Thus, the program may determine whether the user is attempting to move any side of the toolbar closer than the threshold distance, and if so, automatically restrict the movement so that the toolbar cannot get closer than the threshold distance. The program may warn the user that the toolbar is being moved to an invalid position. Additionally or alternatively, the program may display a graphical boundary as an indication of where the toolbar can be placed without restriction.

An example embodiment of the present disclosure is directed to one or more processors, which can be implemented using any conventional processing circuit and device or combination thereof, e.g., a CPU of a Personal Computer (PC) or a mobile computer or other workstation processor, to execute code provided, e.g., on a non-transitory computer readable storage medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, tablet, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present disclosure is directed to a non-transitory, hardware computer-readable medium on which are stored instructions executable by a processor to perform any one or more of the methods described herein.

An example embodiment of the present disclosure is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present disclosure may be implemented in a variety of forms, and that the various embodiments can be implemented alone or in combination. Therefore, while the embodiments of the present disclosure have been described in connection with particular examples thereof, the true scope of the embodiments and/or methods of the present disclosure should not be so limited since other modifications will become apparent to the skilled practitioner upon a study of the drawings and specification.

What is claimed is:

1. A computer-implemented method, comprising:
    generating a graphical user interface (GUI) displaying a first page having first content;
    overlaying a toolbar on the GUI;
    analyzing the first content to determine one or more corresponding toolbar elements corresponding to the first content;
    in response to the analyzing, animating the toolbar on the GUI to add the one or more corresponding toolbar elements;
    measuring an intensity of ambient light received at a light detecting device;
    in response to the measuring, altering the one or more corresponding toolbar elements of the toolbar;
    detecting a GUI change causing the GUI to display a second page having second content; and
    in response to the detecting, altering a transparency of the toolbar.

2. The computer-implemented method of claim 1, further comprising:
    in response to the detecting, animating the toolbar on the GUI to add one or more toolbar elements corresponding to the second content.

3. The computer-implemented method of claim 1, further comprising:
    in response to the detecting, altering a background color of the toolbar.

4. The computer-implemented method of claim 1, further comprising:
    measuring a length of time;
    determining that the length of time exceeds a predetermined threshold; and
    in response to the determining, altering the one or more corresponding toolbar elements of the toolbar.

5. The computer-implemented method of claim 1, further comprising:
    monitoring user interactions with the first page displayed on the GUI;
    in response to the monitoring, detecting a user interaction with a button of the first page; and
    in response to the detecting, altering the one or more corresponding toolbar elements of the toolbar based on the interaction with the button.

6. A system, comprising:
a memory; and
at least one processor coupled to the memory, the at least one processor configured to:
  generate a graphical user interface (GUI) displaying a first page having first content;
  overlay a toolbar on the GUI;
  analyze the first content to determine one or more corresponding toolbar elements corresponding to the first content;
  in response to the analyzing, animate the toolbar on the GUI to add the one or more corresponding toolbar elements;
  measure an intensity of ambient light received at a light detecting device;
  in response to the measuring, alter the one or more corresponding toolbar elements of the toolbar;
  detect a GUI change causing the GUI to display a second page having second content; and
  in response to the detecting, alter a transparency of the toolbar.

7. The system of claim 6, wherein the at least one processor is further configured to:
  in response to the detecting, animate the toolbar on the GUI to add one or more toolbar elements corresponding to the second content.

8. The system of claim 6, wherein the at least one processor is further configured to:
  in response to the detecting, alter a background color of the toolbar.

9. The system of claim 6, wherein the at least one processor is further configured to:
  measure a length of time;
  determine that the length of time exceeds a predetermined threshold; and
  in response to the determining, alter the one or more corresponding toolbar elements of the toolbar.

10. The system of claim 6, wherein the at least one processor is further configured to:
  monitor user interactions with the first page displayed on the GUI;
  in response to the monitoring, detect a user interaction with a button of the first page; and
  in response to the detecting, alter the one or more corresponding toolbar elements of the toolbar based on the interaction with the button.

11. A non-transitory computer-readable device having instructions stored thereon that, when executed by at least one computing device, cause the at least one computing device to perform operations comprising:
  generating a graphical user interface (GUI) displaying a first page having first content;
  overlaying a toolbar on the GUI;
  analyzing the first content to determine one or more corresponding toolbar elements corresponding to the first content;
  in response to the analyzing, animating the toolbar on the GUI to add the one or m ore corresponding toolbar elements;
  measuring an intensity of ambient light received at a light detecting device;
  in response to the measuring, altering the one or more corresponding toolbar elements of the toolbar;
  detecting a GUI change causing the GUI to display a second page having second content; and
  in response to the detecting, altering a transparency of the toolbar.

12. The non-transitory computer-readable device of claim 11, the operations further comprising:
  in response to the detecting, animating the toolbar on the GUI to add one or more toolbar elements corresponding to the second content.

13. The non-transitory computer-readable device of claim 11, the operations further comprising:
  in response to the detecting, altering a background color of the toolbar.

14. The non-transitory computer-readable device of claim 11, the operations further comprising:
  measuring a length of time;
  determining that the length of time exceeds a predetermined threshold; and
  in response to the determining, altering the one or more corresponding toolbar elements of the toolbar.

15. The non-transitory computer-readable device of claim 11, the operations further comprising:
  monitoring user interactions with the first page displayed on the GUI;
  in response to the monitoring, detecting a user interaction with a button of the first page; and
  in response to the detecting, altering the one or more corresponding toolbar elements of the toolbar based on the interaction with the button.

* * * * *